United States Patent [19]

Tingley

[11] Patent Number: 5,456,781

[45] Date of Patent: Oct. 10, 1995

[54] METHOD OF MANUFACTURING GLUE-LAMINATED WOOD STRUCTURAL MEMBER WITH SYNTHETIC FIBER REINFORCEMENT

[76] Inventor: Daniel A. Tingley, 3310 SW Willamette Ave., Corvallis, Oreg. 97333

[21] Appl. No.: 278,876

[22] Filed: Jul. 22, 1994

Related U.S. Application Data

[63] Continuation-in-part of Ser. No. 37,580, Mar. 24, 1993, Pat. No. 5,362,545.

[51] Int. Cl.$^6$ .................................. E04C 3/12; E04C 3/18
[52] U.S. Cl. ......................... 156/154; 156/267; 156/268
[58] Field of Search ................................. 156/153, 154, 156/267, 268; 428/294, 114, 96, 902; 264/172, 229, 231, 232; 52/223, 309.16, 727, 730.1, DIG. 7

[56] References Cited

U.S. PATENT DOCUMENTS

| | | |
|---|---|---|
| 2,536,183 | 1/1951 | Jamieson . |
| 3,413,188 | 11/1968 | Allen . |
| 3,890,077 | 6/1975 | Holman . |
| 4,108,351 | 8/1978 | Hough . |
| 4,242,406 | 12/1980 | El Bouhnini et al. . |
| 4,312,162 | 1/1982 | Medney . |
| 4,537,398 | 8/1985 | Salminen .............................. 156/330 X |
| 4,615,163 | 10/1986 | Curtis et al. . |
| 4,965,973 | 10/1990 | Engebretsen . |
| 5,000,808 | 3/1991 | Deviney . |
| 5,006,390 | 4/1991 | Kavesh et al. . |
| 5,026,593 | 6/1991 | O'Brien . |
| 5,135,793 | 8/1992 | Socha . |

FOREIGN PATENT DOCUMENTS 4149346  5/1992  Japan .

OTHER PUBLICATIONS

Rowlands et al., "Fiber–Reinforced Wood," *Wood and Fiber Science*, Jan. 1986, vol. 18(1), pp. 39–57.

Wood Design Focus, A Newsletter of Contemporary Wood Engineering, vol. 4, No. 2, Summer 1993, R. J. Leichti, Editor.

Von de Kuilen, Proceedings of the 1991 International Timber Engineering Conference, vol. 3, Sep. 2–5, 1991, pp. 226–233.

Tingley, Proceedings of the 1988 International Conference on Timber Engineering, vol. I, Sep. 19–22, 1988, pp. 422–427.

Tingley, Reinforced Glued–Laminated Wood Beams, 96 page Thesis accepted Nov., 1987 by the University of New Brunswick (Canada) as partial fulfillment for M.S. Eng., Dept. of Civil Engineering.

Tingley, "Predicting Strength Criteria for Kevlar and Fiberglass Reinforced Plastic (KRP & FRP) Glued Laminated Beams," pp. 301–304 from vol. 2 of the Proceedings of the Second *Pacific Engineering Conference*, 1989.

*Primary Examiner*—Jeff H. Aftergut
*Attorney, Agent, or Firm*—Stoel Rives

[57] ABSTRACT

A method of manufacturing a glue laminated structural wood member for bearing a structural load includes bonding together multiple elongate wood segments and a synthetic fiber reinforcement with their lengths generally aligned with the length of the member. The synthetic fiber reinforcement includes multiple synthetic fiber strands held within a resin matrix.

1 Claim, 2 Drawing Sheets

METHOD OF MANUFACTURING GLUE-LAMINATED WOOD STRUCTURAL MEMBER WITH SYNTHETIC FIBER REINFORCEMENT

RELATED APPLICATION

This application is a continuation-in-part of U.S. patent application Ser. No. 08/037,580, filed Mar. 24, 1993 for "Aligned Fiber Reinforcement Panel for Structural Wood Members, now U.S. Pat. No. 5,362,545."

TECHNICAL FIELD

The present invention relates to wood structural members and, in particular, to methods of manufacturing glue laminated wood structural members.

BACKGROUND OF THE INVENTION

Beams, trusses, joists, and columns are the typical structural members that support the weight or loads of structures, including buildings and bridges. Structural members may be manufactured from a variety of materials, including steel, concrete, and wood, according to the structure design, environment, and cost.

Wood structural members are now typically manufactured from multiple wood segments that are bonded together, such as in glue-laminated members, laminated veneer lumber, parallel strand lumber and I-beams. These manufactured wood structural members have replaced sawn lumber or timbers because the former have higher design limits resulting from better inspection and manufacturing controls. Wood is a desireable material for use in many structural members because of its various characteristics, including strength for a given weight, appearance, cyclic load response, and fire resistance.

In any application, a load subjects a structural member to both compressive and tensile stresses, which correspond to the respective compacting and elongating forces induced by the load on opposite sides of the member. By convention, a neutral plane or axis extends between the portions of the member under compression and tension. The structural member must be capable of bearing the compressive and tensile stresses without excessive strain and particularly without ultimately failing.

Reinforcement of wood structural members in regions subjected to tensile stresses are known. For example, U.S. Pat. No. 5,026,593 of O'Brien describes the use of a thin flat aluminum strip to reinforce a laminated beam. The use of a synthetic tension reinforcement having multiple aramid fiber strands held within a resin matrix adhered to at least one of the wood segments in the tension portion of the structural member is described by the inventor of the present application in "Reinforced Glued-Laminated Wood Beams" presented at the 1988 International Conference on Timber Engineering.

Despite prior descriptions of reinforced wood structural members, methods suitable for large scale manufacturing of structural wood members with synthetic reinforcement are not available. Some conventional methods of manufacturing structural wood members are unworkable with synthetic fiber reinforcements. Other conventional methods of manufacturing structural wood members would be inefficient and wasteful of relatively expensive synthetic fiber reinforcement.

SUMMARY OF THE INVENTION

An object of the present invention is, therefore, to provide a method of manufacturing wood structural members with synthetic fiber reinforcement.

Another object of this invention is to provide such a method that allows efficient application of synthetic reinforcement to wood structural members.

A further object of this invention is to provide such a method that prevents waste of synthetic reinforcement.

In a preferred embodiment, the present invention includes a method of manufacturing glue laminated wood structural members in which multiple elongate wood segments and a synthetic fiber reinforcement are bonded together with their lengths generally aligned with the length of the member. The synthetic fiber reinforcement includes multiple synthetic fiber strands having a high modulus of elasticity in tension and/or compression held within a resin matrix.

In another preferred embodiment of this invention, synthetic fiber reinforcement is formed with suitable characteristics to be wound onto reels or spools. As a result, arbitrary lengths of synthetic fiber reinforcement can be drawn and cut for use within glue laminated structural wood members of arbitrary length without waste. Similarly, synthetic fiber reinforcement is formed with a width that is matched to a finished width the wood members. Methods of applying synthetic fiber reinforcement to wood laminae are also disclosed.

Additional objects and advantages of this invention will be apparent from the following detailed description of preferred embodiments thereof which proceeds with reference to the accompanying drawings.

DETAILED DESCRIPTION OF PREFERRED EMBODIMENTS

Figure 1:
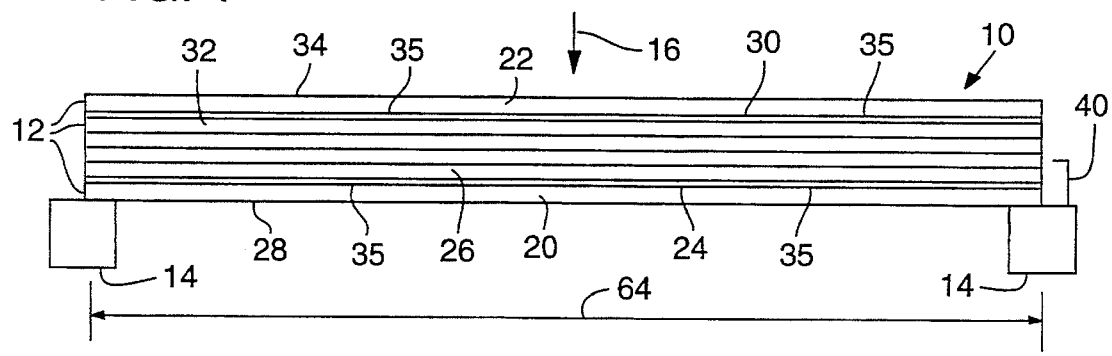
FIG. 1 is an elevation view of an exemplary glue laminated structural wood member having synthetic fiber reinforcement according to the present invention.

FIG. 1 shows a glue laminated wood structural member 10 having multiple wood laminae 12 that are bonded together and are preferably elongate boards. In this configuration, glue laminated wood member 10 is configured as a glue-laminated timber according to manufacturing standards 117-93 of the American Institute of Timber Construction (AITC) of Englewood, Colo.

A typical structural use of glue laminated wood member 10 is to extend as a beam over and bear a load along an otherwise open region. As a simplified, exemplary representation of such use, glue laminated wood member 10 is shown with its ends supported by a pair of blocks 14 and bearing a point load 16 midway between blocks 14. It will be appreciated, however, that glue laminated wood member 10 of the present invention could also bear loads distributed in other ways (e.g., cantilevered) or be used as a truss, joist, or column.

Under the conditions represented in FIG. 1, a lowermost lamina 20 is subjected to a substantially pure tensile stress, and an uppermost lamina 22 is subjected to a substantially pure compressive stress. To increase the tensile load-bearing capacity of glue laminated wood member 10, at least one layer of synthetic tension reinforcement 24 is adhered between lowermost lamina 20 and a next adjacent lamina 26 or, alternatively, to only an outer surface 28 of lowermost lamina 20. To increase the compressive load-bearing capacity of glue laminated wood member 10, at least one layer of synthetic compression reinforcement 30 is adhered between uppermost lamina 22 and a next adjacent lamina 32 or, alternatively, to only the outer surface 34 of uppermost lamina 22. Synthetic reinforcements 24 and 30 are described below in greater detail.

Synthetic tension reinforcement 24 and synthetic compression reinforcement 30 are generally centered about load 16 and preferably extend along about two-fifths to three-fifths the length of wood structural member 10, depending on load 16. A pair of wood spacers 35 are positioned at opposite ends of synthetic tension reinforcement 24 between laminae 20 and 26 to maintain a uniform separation therebetween. Similarly, a pair of wood spacers 35 are positioned at opposite ends of synthetic compression reinforcement 30 between laminae 22 and 32 to maintain a uniform separation therebetween.

General aspects of the process for manufacturing of glue laminated structural wood member 10 are the same as the process for manufacturing conventional glue laminated structural wood members. With regard to the manufacture of conventional glue laminated structural wood members, wood laminae are carried by a conveyor through a glue spreader, which applies multiple thin streams of adhesive (e.g., resorcinol) along the length of each wood lamina on one of its major surfaces.

Wood laminae are successively aligned with and set against other wood laminae in a stack that may be oriented horizontally or vertically. The wood laminae are arranged so that the adhesive on the major surface of one wood lamina engages the bare major surface of an adjacent wood lamina. After all the wood laminae are aligned with and set against each other, pressure in the range of about 125–250 psi is applied to the stack and the adhesive allowed to cure. As is known in the art, sufficient pressure is applied to establish consistent gluelines between adjacent wood laminae 12 of no more than 4 mils (0.10 mm) thick. The adhered stack of wood laminae 12 is exposed to form a conventional glue laminated structural wood member.

In accordance with the present invention, various aspects of this conventional manufacturing process are modified to be compatible with the inclusion of synthetic fiber reinforcements 24 and 30 in wood member 10. In a first preferred embodiment, synthetic fiber reinforcements 24 and 30 are carried through a conventional glue spreader (not shown), which applies multiple thin streams of adhesive (e.g., resorcinol) along the length of each reinforcement 24 or 30 on one of its major surfaces. Adhesion between wood laminae 12 and reinforcements 24 or 30 can be relatively poor when using a nonepoxy adhesive such as resorcinol applied in the conventional manner. Adhesion is improved, however, when the adhesive is spread to generally completely cover the major surfaces of synthetic fiber reinforcements 24 and 30.

It will be appreciated that such spreading of the adhesive can be accomplished by spreading the adhesive applied to one of the major surfaces of synthetic fiber reinforcements 24 and 30 or by spreading the adhesive applied to one of the major surfaces of a wood lamina to be applied to one of synthetic fiber reinforcements 24 and 30. The spreading of adhesive may be accomplished, for example, by manually spreading the adhesive before synthetic fiber reinforcements 24 and 30 and adjacent wood laminae 12 are engaged or by engaging them and sliding them against each other before the adhesive sets.

In another preferred embodiment, synthetic fiber reinforcements 24 and 30 are manufactured with respective widths 42 and 44 (FIGS. 2A and 2B) that are matched to the finished width of wood member 10 (extending into the plane of FIG. 1) and are therefore less than the widths of wood laminae 12 used to form wood member 10. The original widths of wood laminae 12 used to form wood member 10 can vary so long as they are greater than the finished width of wood member 10. As a result, planing of synthetic fiber reinforcements 24 and 30 is avoided, which prevents waste of the relatively expensive reinforcement materials. Moreover, synthetic fiber reinforcements 24 and 30 sometimes would not provide a smooth, finished surface when planed, so avoiding the planing of synthetic fiber reinforcements 24 and 30 helps provide wood member 10 with a smooth, finished surface.

During manufacture of wood member 10, different wood laminae 12 and synthetic fiber reinforcements 24 and 30 are successively aligned with and set against each other in a stack that may be oriented horizontally or vertically. Alignment of the wood laminae in a conventional glue laminated structural wood member is typically achieved by aligning the sides of adjacent wood laminae. A consequence of widths 42 and 44 of synthetic fiber reinforcements 24 and 30 being less than the original widths of wood laminae 12 is that synthetic fiber reinforcements 24 and 30 cannot be aligned with wood laminae 12 by conventional methods.

In accordance with the present invention, therefore, manufacture of glue laminated structural wood member 10 includes mechanically securing synthetic fiber reinforcements 24 and 30 to adjacent wood laminae 12 prior to the curing of the adhesive. For example, glue laminated structural wood member 10 may be manufactured by positioning wood laminae 12 and synthetic fiber reinforcements 24 and 30 in a horizontal stack (i.e., glue laminated structural wood member 10 being positioned on its side). Synthetic fiber reinforcements 24 and 30 are secured with small nails (e.g., pin nails that are air-driven) to wood lamina 12 to which the reinforcements are being adhered and the nails left in wood member 10 as additional laminae are applied.

As another example, glue laminated structural wood member 10 may be manufactured by positioning wood laminae 12 and synthetic fiber reinforcements 24 and 30 in a vertical stack (i.e., glue laminated structural wood member 10 being positioned upright). Synthetic fiber reinforcements 24 and 30 are secured to wood lamina 12 to which reinforcements 24 and 30 are being adhered with plastic or metal straps or bands encircling their widths and being closed under tension. After the adhesive cures to hold synthetic fiber reinforcements 24 and 30 to their adjacent wood laminae 12, the portions of the straps or bands extending from the sides of wood member 10 are cut and removed and the portions within wood member 10 remain there.

Figure 2A:
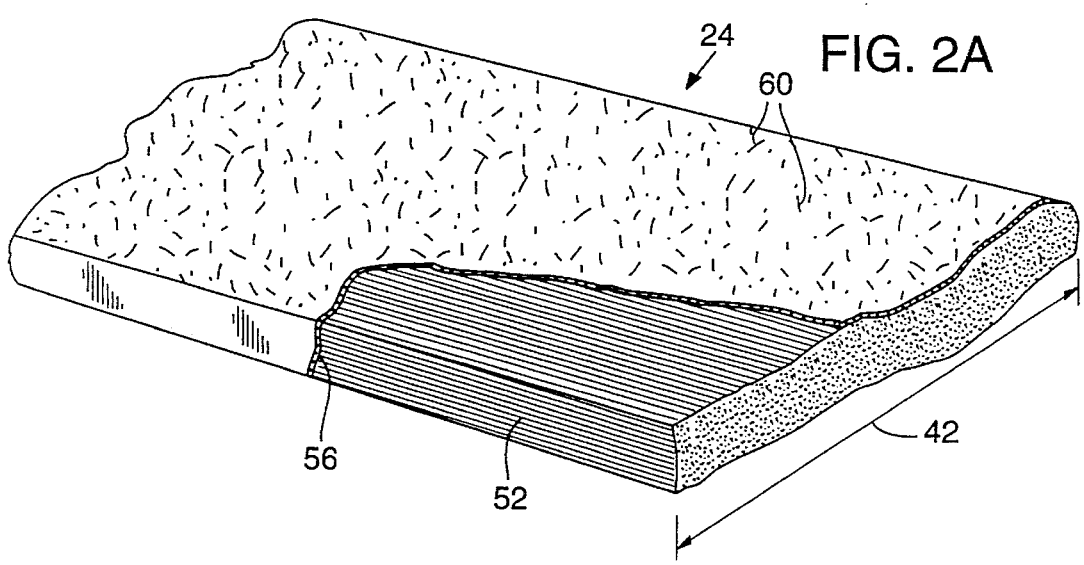
FIGS. 2A and 2B are perspective views of sections of respective synthetic tension and compression reinforcements with portions cut-away to show the alignments and orientations of fibers in the reinforcements.
Figure 2B:
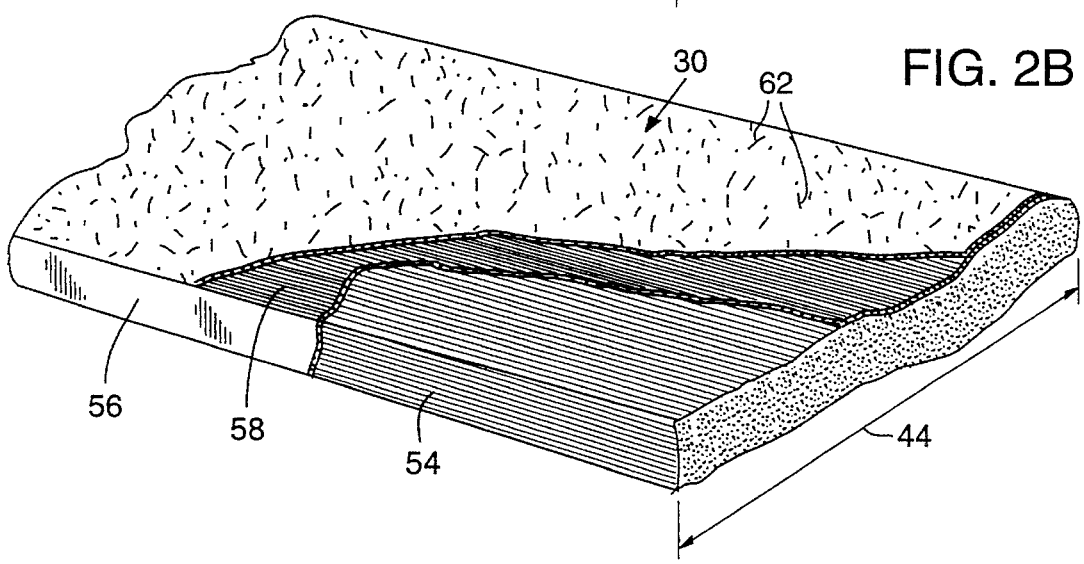

FIGS. 2A and 2B are enlarged perspective views of one layer each of preferred synthetic tension reinforcement 24 and preferred synthetic compression reinforcement 30, respectively. Tension reinforcement 24 and compression reinforcement 30 have large numbers of synthetic fibers 52 and 54 that are arranged parallel to one another, aligned with the length of reinforcements 24 and 30, and have relatively high moduli of elasticity in tension and compression, respectively.

A resin material 56 surrounds and extends into the interstices between synthetic fibers 52 and 54 to maintain them in their arrangement and alignment. To facilitate their adhesion to wood laminae 12, reinforcements 24 and 30 are preferably manufactured and treated as described in copending U.S. patent application Ser. No. 08/037,580, filed Mar. 24, 1993, which is hereby incorporated by reference.

Accordingly, compression reinforcement 54 includes a synthetic fiber layer 58 that further enhances the adhesion of compression reinforcement 30. Also, the major surfaces of reinforcements 24 and 30 are abraded or "haired up" so that adjacent fibers 52 and 58 are broken and their ends 60 and 62 protrude from resin material 56, respectively.

The parallel arrangement and longitudinal alignment of the fibers 52 and 54 provide synthetic tension reinforcement 24 and synthetic compression reinforcement 30 with maximal strength. Suitable for use as synthetic tension fibers 52 and synthetic fiber layer 58 are aramid fibers, which are commercially available from E. I. DuPont de Nemours & Co. of Delaware under the trademark "KEVLAR," and high modulus polyethylene which is available under the trademark "SPECTRA" from Allied Fibers of Allied Signal, Petersberg, Va. A preferred grade of synthetic fibers 52 and layer 58 is an aramid fiber available as "KEVLAR 49."

Synthetic fibers 52 preferably have a modulus of elasticity in tension that is relatively high. For example, synthetic fibers 52 of Kevlar™ have a modulus of elasticity in tension of about $18 \times 10^6$ psi (124,000 MPa). Synthetic tension reinforcement 24 comprising about 60 percent synthetic fibers 52 to 40 percent resin material 56 (by volume) has a modulus of elasticity in tension of about $11 \times 10^6$ psi (75,900 MPa).

Suitable for use as synthetic compression fibers 54 are commercially available carbon fibers, which have a modulus of elasticity in compression in the range of about $34 \times 10^6$ to $36 \times 10^6$ psi (234,000–248,000 MPa). Synthetic compression reinforcement 30 comprising about 60 percent synthetic fibers 54 to 40 percent resin material 56 (by volume) has a modulus of elasticity in compression in the range of about $18 \times 10^6$ to $19 \times 10^6$ psi (124,000–1,000 MPa). Resin material 56 used in fabrication of both reinforcement 24 and reinforcement 30 is preferably an epoxy resin, but could alternatively be other resins such as polyester, vinyl ester, phenolic resins, polyimides, or polystyrylpyridine (PSP) or thermoplastic resins such as polyethylene terephthalate (PET) and nylon-66.

To minimize waste and to simplify handling and use, synthetic fiber reinforcements 24 and 30 are formed so as to be wound onto a reel so that arbitrary lengths can be drawn and cut for use within wood members 10 of arbitrary length 64. A major factor that allows synthetic fiber reinforcements 24 and 30 to be wound onto reels of workable diameters (e.g., in the range of about 39 to 72 inches (99–183 cm)) is that they are formed with relatively small thicknesses of 0.010 to 0.250 inch (0.25–6.4 cm).

Another major benefit of such relatively thin synthetic reinforcements 24 and 30 is that substantially arbitrary amounts of strength enhancement can be obtained by using multiple layers of such synthetic reinforcements 24 and 30, such as at the locations shown in FIG. 1. In practice, single layers of such relatively thin synthetic reinforcements 24 and 30 would typically provide less than optimal strength enhancement of wood member 10. However, the prevention of waste and simplified handling provided by reeling synthetic reinforcements 24 and 30, together with the relatively fine variability of strength enhancement by multiplication of reinforcement layers, make such relatively thin synthetic reinforcements 24 and 30 particularly useful for the efficient manufacture of wood member 10.

Other factors that allow synthetic fiber reinforcements 24 and 30 to be wound onto reels are the fibers 52 and 54 and resin material that are used, as described above. These materials allow synthetic fiber reinforcements 24 and 30 to be cut in arbitrary lengths with commonly available tools, preferably a carbide tipped saw, a high speed steel-tipped saw, or a diamond wheel. In contrast, conventional manufacturing methods for reinforced structural wood members employ reinforcing panels of full thickness and fixed lengths that typically undergo some trimming to fit, thereby wasting relatively large amounts of expensive reinforcing material.

Synthetic fiber reinforcements 24 and 30 are preferably fabricated by pultrusion, which is a continuous manufacturing process for producing lengths of fiber reinforced plastic parts. Generally, pultrusion involves pulling flexible reinforcing fibers through a liquid resin bath and then through a heated die where the reinforced plastic is shaped and the resin is cured. Pultruded parts typically have longitudinally aligned fibers for axial strength and obliquely aligned fibers for transverse strength. In accordance with the present invention, however, preferred reinforcements 24 and 30 are manufactured with substantially all respective fibers 52 and 54 in a parallel arrangement and longitudinal alignment to provide maximal strength. In some circumstances, such as to enhance shear resistance in reinforcements 24 and 30, less than substantially all of respective fibers 52 and 54 would be in a parallel arrangement and longitudinal alignment.

Figure 3:
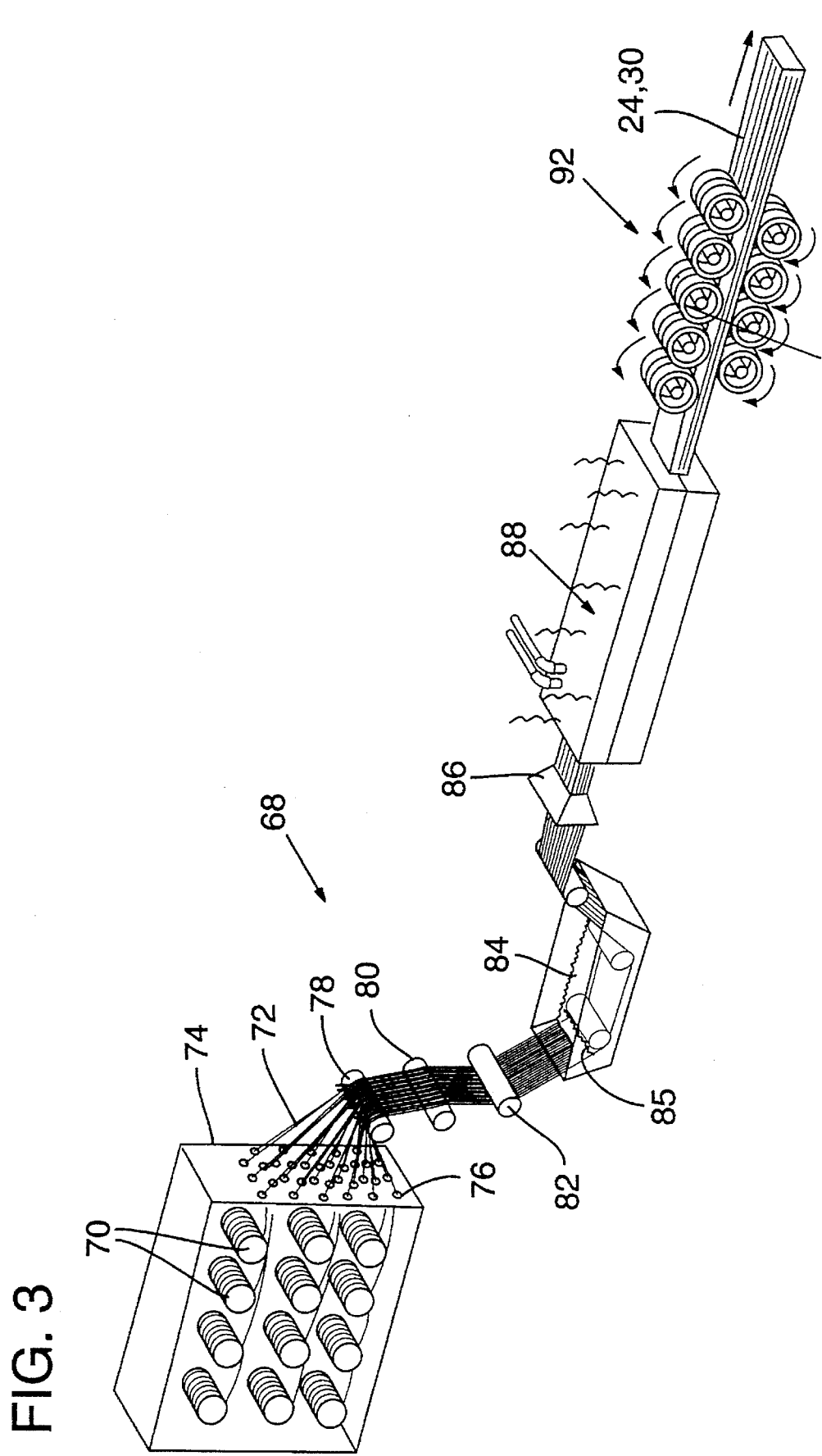
FIG. 3 is a perspective view of a pultrusion apparatus for producing an elongate synthetic reinforcement of the present invention.

FIG. 3 shows a preferred pultrusion apparatus 68 for fabricating synthetic fiber reinforcements 24 and 30. Multiple bobbins 70 carry synthetic fiber rovings 72. As is known in the art, filaments are grouped together into strands or fibers, which may be grouped together into twisted strands to form yarn, or untwisted strands to form rovings. Rovings 72 are fed through openings 76 in an alignment card 74 that aligns that rovings 72 and prevents them from entangling. Openings 76 are typically gasketed with a low friction material, such as a ceramic or plastic, to minimize abrasion of or resistance to rovings 72.

Rovings 72 pass from card 74 to a first comb 78 that gathers them and arranges them parallel to one another. Rovings 72 then pass over a tensioning mandrel 80, under a second alignment comb 82, and through close-fitting eyelets 85 directly into a resin bath 84 where rovings 72 are thoroughly wetted with resin material. Passing rovings 72 into resin bath 84 through eyelets 85 minimizes the waste of rovings 72 whenever pultrusion apparatus 68 is stopped. Resin-wetted rovings 72 are gathered by a forming die 86 and pass through a heated die 88 that cures the resin material and shape rovings 72 into reinforcements 24 and 30. Multiple drive rollers 92 pull the reinforcements 24 and 30 and rovings 72 through pultrusion apparatus 68 at a preferred rate of 3–5 feet/minute (0.9–1.5 m/minute).

Pultrusion apparatus 68 is capable of forming synthetic reinforcements 24 and 30 without longitudinal cracks or faults extending through and with cross-sectional void ratios of no more than 5 percent. Cross-sectional void ratios refer to the percentage of a cross-sectional area of synthetic reinforcements 24 and 30 between respective fibers 52 and 54, typically occupied by resin material, and is measured by scanning electron microscopy. The absence of faults and the low void ratios assure that synthetic reinforcements 24 and 30 are of maximal strength and integrity.

The preferred resin materials, as described above and applied to rovings 72, have a glass transition temperature within a range of 250°–300° F. Glass transition is an indicator of resin flexibility and is characterized as the temperature at which the resin loses its hardness or brittleness, becomes more flexible, and takes on rubbery or leathery properties. A glass transition temperature within the preferred range is desireable because it provides a minimal fire resistance temperature. The preferred cure rate of the resin material, which is the amount of material that cures from a monomer structure to a polymer structure, is 78 to 82 percent. It has been determined that synthetic reinforcements 24 and 30 with cure rates within this range have higher shear stress bearing capabilities at interfaces with both synthetic reinforcements and wood laminae.

Preferably, a fiber tension force in the range of about three to eight pounds is applied to rovings 72 during the resin cure. The fiber tension force may be applied as a back pressure by tensioning mandrel 80 in combination with combs 78 and 82 or by the use of friction bobbins 70, wherein rotational friction of the bobbins may be adjusted to provide the desired back pressure on rovings 72. Such tension in the fibers assists in maintaining their parallel arrangement and alignment in reinforcements 24 and 30. Also, by curing the resin material while the fibers are under tension, reinforcements 24 and 30 have greater rigidity and therefore decrease deflection of wood member 10 upon loading.

It will be obvious to those having skill in the art that many changes may be made to the details of the above-described embodiment of this invention without departing from the underlying principles thereof. The scope of the present invention should be determined, therefore, only by the following claims.

I claim:

1. In a method of manufacturing glue laminated wood structural member for bearing a structural load, the glue laminated wood structural member having a finished width upon completing of manufacture, the improvement comprising:

bonding plural elongate wood laminae together with their lengths generally aligned with the longitudinal axis of the glue laminated wood member, each of the wood laminae having a laminae width greater than the finished width;

bonding a synthetic tension reinforcement having plural tension fiber strands held within a resin matrix to at least one of the wood laminae in the tension portion of the structural member, the synthetic tension reinforcement having a reinforcement width matched to that of the finished width; and planing the wood laminae to the finished width.

\* \* \* \* \*